US007592782B2

(12) United States Patent
Rydman et al.

(10) Patent No.: US 7,592,782 B2
(45) Date of Patent: *Sep. 22, 2009

(54) SUPERCAPACITOR ENGINE STARTING SYSTEM WITH CHARGE HYSTERESIS

(75) Inventors: Todd Edward Rydman, Tualatin, OR (US); Christopher S. Brune, Tualatin, OR (US); Daniel Sama Rubio, Sherwood, OR (US); Carl R. Smith, Boring, OR (US)

(73) Assignee: Cooper Technologies Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/008,230

(22) Filed: Jan. 9, 2008

(65) Prior Publication Data

US 2008/0111524 A1 May 15, 2008

Related U.S. Application Data

(63) Continuation of application No. 10/876,389, filed on Jun. 25, 2004, now Pat. No. 7,319,306.

(51) Int. Cl.
*H01M 10/46* (2006.01)
(52) U.S. Cl. ...................................... 320/166
(58) Field of Classification Search ................. 320/130, 320/150, 166, 167; 123/179.1, 179.14, 179, 123/15
See application file for complete search history.

(56) References Cited

U.S. PATENT DOCUMENTS 6,202,615 B1 * 3/2001 Pels et al. ................. 290/38 R

* cited by examiner

*Primary Examiner*—Edward Tso
(74) *Attorney, Agent, or Firm*—Armstrong Teasdale LLP

(57) ABSTRACT

An internal combustion motor assembly, including an internal combustion motor, a starter and a battery. In addition, the motor assembly includes a capacitor assembly, a capacitor charging assembly and a conductive network, logic and controlled switching assembly adapted to place the internal combustion motor into one of a set of states. This set includes a first state in which the capacitor assembly is receiving charge from the capacitor charging assembly but is not electrically connected to the starter; a second state in which the capacitor assembly is electrically connected to and powers the starter; and a third state in which both the battery and the capacitor assembly are electrically connected to and power the starter. The logic and controlled switching assembly places the internal combustion motor assembly into the third state after it has been in the second state and a set of criteria is met.

9 Claims, 2 Drawing Sheets

US 7,592,782 B2

SUPERCAPACITOR ENGINE STARTING SYSTEM WITH CHARGE HYSTERESIS

CROSS-REFERENCE TO RELATED APPLICATION

This application is a continuation of application Ser. No. 10/876,389, filed Jun. 25, 2004, now U.S. Pat. No. 7,319,306, issued Jan. 15, 2008.

BACKGROUND OF THE INVENTION

The development of the supercapacitor (ie., a capacitor of greater than 200 Farads) has resulted in the use of capacitors as stores of electric energy for starting automotive engines. A fairly early example is U.S. Pat. No. 5,146,095, issued to Tsuchiya et al. Here a supercapacitor is charged up as the automobile driver turns his key to start his vehicle. Then the charge on the supercapacitor is used to start the automobile engine. This procedure avoids the strong current draw from the battery that is otherwise necessary every time an automobile is started.

One disadvantage of this mechanism, however, is that the vehicle user must wait for the supercapacitor to be charged up every time he starts his automobile. Also, there is a possibility that the engine will not start, given the amount of energy stored in the capacitor. Furthermore, it appears that if the capacitor were broken and unable to accept a full charge, that the vehicle operator would be left with a nonfunctional vehicle.

Although a number of other references exist detailing the use of a supercapacitor in starting an internal combustion engine, none of these references detail a system that both avoids an intense current draw from the battery at first starting up an engine and that almost never requires the automobile user to wait when first starting his automobile.

SUMMARY OF THE INVENTION

In a first separate aspect the present invention is an internal combustion motor assembly, including an internal combustion motor, a starter and a battery. In addition, the motor assembly includes a capacitor assembly, a capacitor charging assembly and a conductive network, logic and controlled switching assembly, adapted to place the motor assembly into one of a set of states. This set includes a first state in which the capacitor assembly is electrically connected to and receiving charge from the capacitor charging assembly, but is not electrically connected to the starter; a second state in which the capacitor assembly is electrically connected to and powers the starter; and a third state in which both the battery and the capacitor assembly are electrically connected to and power the starter. The conductive network, logic and controlled switching assembly places the internal combustion motor assembly into the third state after it has been in the second state and any one of a predetermined set of criteria sets is met.

In a second separate aspect, the present invention is an internal combustion motor assembly including an internal combustion motor, a starter, a capacitor adapted to, at least in part, power the starter, and a capacitor charging assembly adapted to charge the capacitor. In addition, a capacitor charging control element is adapted to control the capacitor charging assembly so that the capacitor is charged to a first voltage and is later recharged to the first voltage whenever its voltage drops below a second voltage that is at least 0.5 volts lower than the first voltage.

In a third separate aspect, the present invention is an internal combustion motor assembly including an internal combustion motor, a battery, a starter, a capacitor adapted to, at least in part, power the starter, and a capacitor charging assembly adapted to charge the capacitor. In addition, a capacitor charging sensing and control circuit is adapted to detect a condition in which the capacitor has at least some impairment in its ability to accept charge and is adapted to respond to this condition by switching the motor assembly to a state in which the capacitor is not used to power the starter.

In a fourth separate aspect, the present invention is an internal combustion motor assembly including an internal combustion motor, a starter, and a capacitor charging assembly adapted to charge the capacitor to a first voltage level. In addition, a manual engine start actuator is adapted to permit an operator to activate the starter and a capacitor low voltage starter lockout system disables the actuator when the capacitor is not charged to a predetermined voltage.

The foregoing and other objectives, features and advantages of the invention will be more readily understood upon consideration of the following detailed description of the preferred embodiment(s), taken in conjunction with the accompanying drawings.

DETAILED DESCRIPTION OF THE PREFERRED EMBODIMENT(S)

Figure 1:
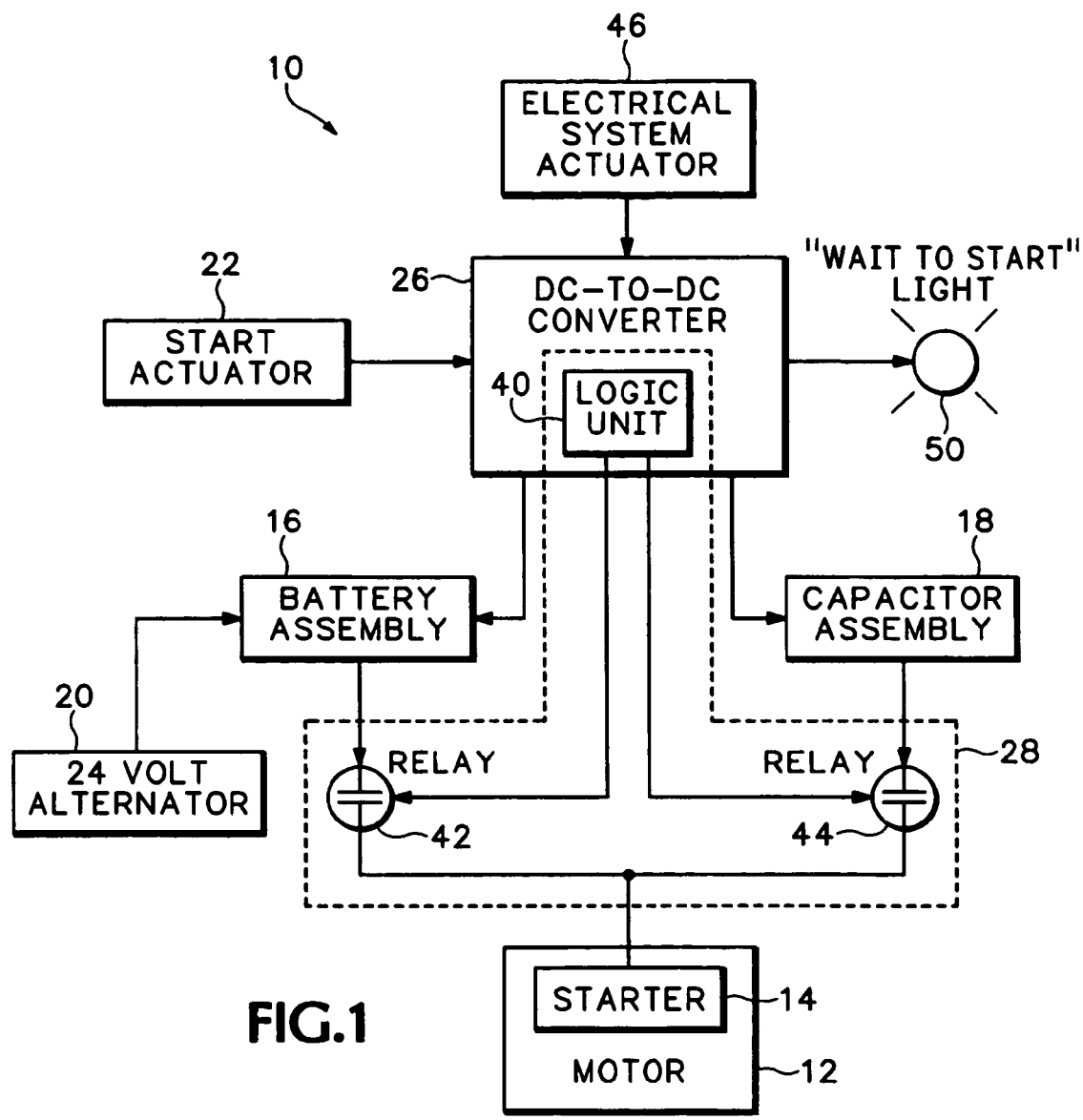
FIG. 1 is a block diagram of an internal combustion motor assembly according to the present invention.

Referring to FIG. 1, a preferred embodiment of the present invention includes an internal combustion motor assembly 10. Conventional items included in assembly 10 include a motor 12, a starter 14, an alternator 20 and a motor start actuator 22 for permitting a vehicle operator to start the motor 12. In addition, a battery assembly 16 and a capacitor assembly 18 include one or more batteries and capacitors, respectively. In addition, a DC-to-DC converter/controller 26 is controlled by an internal logic unit 40, which is also a part of a conductive network, logic and controlled switching assembly 28. The starter 14 is provided with electrical power in accordance with a predetermined scheme, discussed below, implemented by assembly 28.

Also included in assembly 28 and controlled by unit 40 are a battery-to-starter relay 42 and a capacitor-to-starter relay 44. An electrical system actuator 46 is used by a vehicle operator to activate the vehicle electrical system, prior to starting the motor. A "wait-to-start" light 50 advises a vehicle operator to not press the start actuator 22, in accordance with criteria described below.

Figure 2:
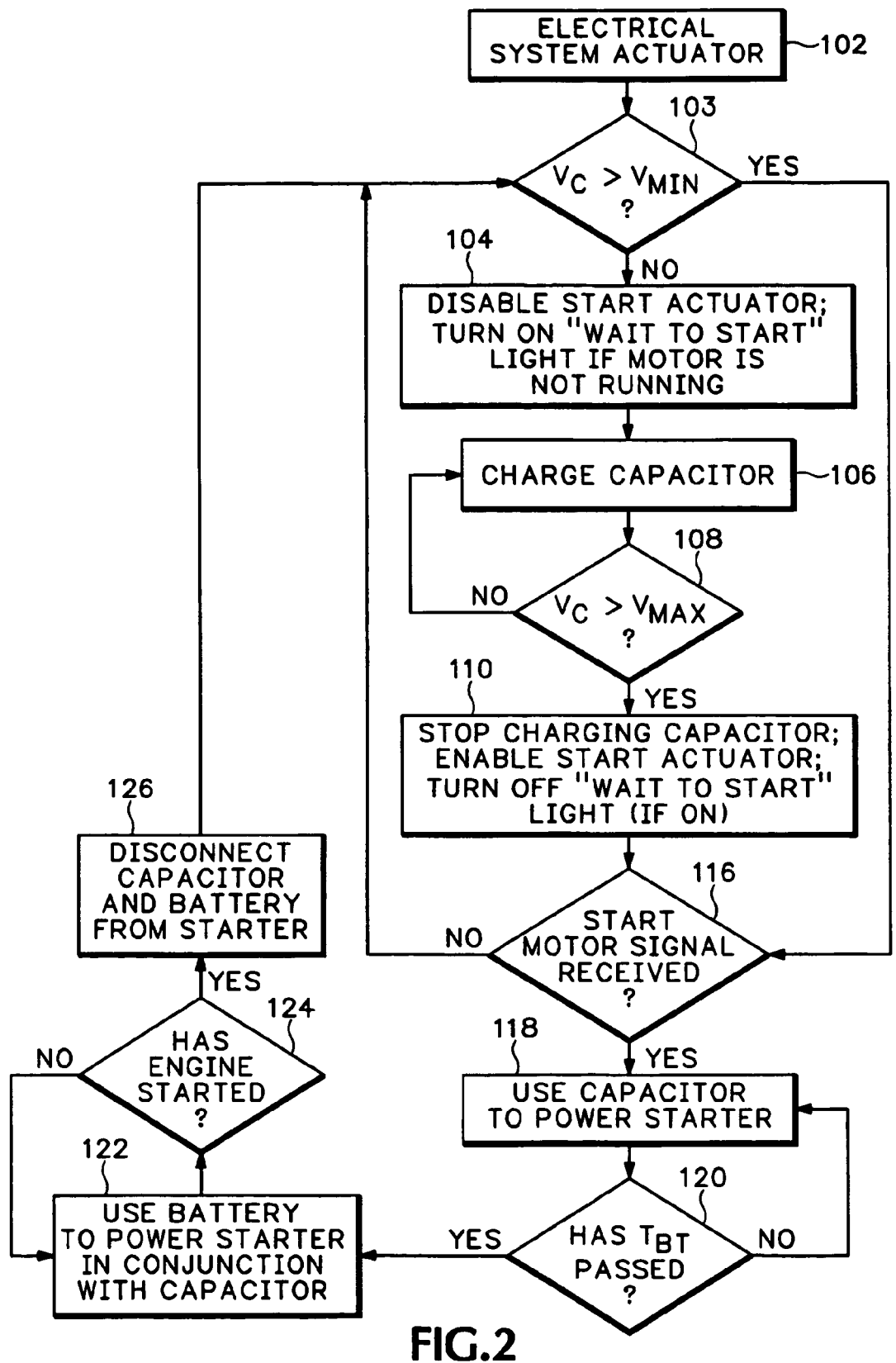
FIG. 2 is a flow chart of a scheme of operation of the motor assembly of FIG. 1, according to the present invention.

FIG. 2 illustrates the operation 100 of assembly 10 by logic unit 40. When the electric system is first activated (block 102), unit 40 checks to see if the capacitor voltage, $V_c$, is above the minimum voltage for starting the motor, $V_{min}$, required for the present temperature (box 103). At below 0° c., $V_{min}$ is equal to 29 Volts and at greater than 0° c., $V_{min}$ is equal to 24 Volts. The temperature may be measured either at the logic unit 40, at capacitor assembly 18 or at motor 12. In one preferred embodiment logic unit 40 receives temperature measurements both from motor 12 and from capacitor assembly 18 and sets $V_{min}$ on the basis of the temperature reading from motor 12, as this is the best indication of how much energy will be required to start motor 12.

If $V_c$ is below $V_{min}$, the start actuator 22 is disabled and the "wait to start" light 50 is activated (block 104); then the converter/controller 26 charges the capacitor assembly 18 (block 106) until a voltage, $V_{max}$, is reached (box 108). $V_{max}$, similar to $V_{min}$, is a function of the temperature measured at that time. In one preferred embodiment $V_{max}$ is 28 Volts at greater than 0° C., and 30 Volts at below 0° C. In one preferred embodiment all logic measurements are taken at logic unit 40. In another preferred embodiment a temperature measurement taken at the capacitor assembly 18 determines $V_{max}$ because the maximum voltage to which a capacitor can be charged is inversely related to temperature. After $V_{max}$ is reached, the converter/controller 26 stops delivering current to capacitor assembly 18, the engine start actuator 22 is enabled and the "wait to start" light 50 is deactivated (box 110). At this point, motor 12 is ready to be started and the assembly 10 waits for a start engine signal from actuator 22.

When a "start engine" signal is received (box 116), logic unit 40 closes the capacitor relay 44 (along with the starter solenoid), causing the capacitor assembly 18 to power the starter 14 (block 118). After the starter 14 has been driven by the capacitor assembly for a time period, $T_{BT}$, (box 120) of typically less than a second, the logic unit 40 commands the battery relay 42 to close, causing the battery assembly 16 to assist the capacitor in the further process of engine starting (block 122). For below freezing temperatures $T_{BT}$ equals 0.35 seconds, while at above freezing temperatures $T_{BT}$ is effectively set to infinity, with the battery not being utilized to help start the engine.

In this manner, at below freezing temperatures the battery assembly 16 assists the motor 12 starting process but is not subjected to the destructive large current draw that is necessary in the first few tenths of a second of the starting process. Logic unit 40 then waits for the motor to start (box 124) before opening relays 42 (at below freezing temperatures) and 44 (block 126).

At this point $V_c$ is again compared with $V_{min}$ and if $V_c$ is smaller then is charged again (block 104 through block 110). In this sequence, $V_c$ will typically reach $V_{max}$ while the engine is running and typically will continue above $V_{min}$ until the next engine start command is received. When this is the case, the engine may be started immediately, without waiting for the capacitor to be charged up. Only if at the time the electrical system is actuated (block 102) so much charge has bled from the capacitor assembly 18 that $V_c$ is below $V_{min}$, must the vehicle operator wait through a capacitor recharge sequence.

A capacitor recharge at electrical system actuation is more likely at below freezing temperatures, as the hysteresis is only 1 Volt in this temperature range. This is acceptable, however, because an electric heating element engine warm up sequence, typically taking far longer to accomplish than the capacitor charge sequence, must typically occur at these temperatures. Consequently, the capacitor charge operation does not cause an actual delay to the vehicle operator. The fact that in most instances the motor 12 can be started without a delay, when desired, is a major advantage of this preferred embodiment.

The converter/controller 26 is able to detect if electric current is flowing to capacitor assembly 18. If capacitor assembly 18 is not accepting electric current at voltages below $V_{max}$, then this condition is noted (a "fault" is set) by logic unit 40 and capacitor assembly 18 is effectively taken out of the circuit, with no further capacitor charging being effected and without the use of the capacitor assembly 18 in engine starting. Subsequently, when the ignition is enabled again, the fault is cleared and a further attempt is made to charge the capacitor assembly 18. If it again does not accept charge, the fault is reset.

The terms and expressions that have been employed in the foregoing specification are used as terms of description and not of limitation. There is no intention, in the use of such terms and expressions, of excluding equivalents of the features shown and described or portions thereof, it being recognized that the scope of the invention is defined and limited only by the claims which follow.

The invention claimed is:

1. An internal combustion motor assembly including an internal combustion motor, a starter, a capacitor adapted to, at least in part, power said starter, a capacitor charging assembly adapted to charge said capacitor and a capacitor charging control element adapted to control said capacitor charging assembly so that said capacitor is charged to a first voltage and is later recharged to said first voltage whenever its voltage drops below a second voltage that is at least 0.5 volts lower than said first voltage.

2. The internal combustion motor assembly of claim 1 wherein said second voltage is less than or equal to said first voltage minus one volt.

3. The internal combustion motor assembly of claim 1 wherein said first voltage is greater if a temperature measurement is below a temperature threshold than if said temperature measurement is above said temperature threshold.

4. The internal combustion motor assembly of claim 1 wherein the difference between said first voltage and said second voltage is greater if a temperature measurement is below a temperature threshold than if said temperature measurement is above said temperature threshold.

5. The internal combustion motor assembly of claim 1 wherein said second voltage is greater if a temperature measurement is below a temperature threshold than if said temperature measurement is above said temperature threshold.

6. The internal combustion motor assembly of claim 1 wherein the difference between said first voltage and said second voltage is greater if a temperature measurement is below a temperature threshold than if said temperature measurement is above said temperature threshold.

7. An internal combustion motor assembly including an internal combustion motor, a battery, a starter, a capacitor adapted to, at least in part, power said starter, a capacitor charging assembly adapted to charge said capacitor and a capacitor charging sensing and control circuit adapted to detect a condition in which said capacitor has at least some impairment in its ability to accept charge and adapted to respond to said condition by switching said motor assembly to a state in which said capacitor is not used to power said starter.

8. An internal combustion motor assembly including an internal combustion motor, a starter, a capacitor charging assembly adapted to charge said capacitor to a first voltage level, a manual engine start actuator, adapted to permit an operator to activate said starter and a capacitor low voltage starter lockout system that disables said actuator when said capacitor is not charged to a predetermined voltage.

9. The motor assembly of claim 8 wherein said predetermined voltage varies as a function of a temperature measurement.

* * * * *